US010431963B2

United States Patent
Rajauria et al.

(10) Patent No.: US 10,431,963 B2
(45) Date of Patent: *Oct. 1, 2019

(54) EXHAUST SYSTEM FOR SWITCHGEAR ENCLOSURE, AND SWITCHGEAR ENCLOSURE HAVING THE SAME

(71) Applicant: ABB Schweiz AG, Baden (CH)

(72) Inventors: Samir Rajauria, Pradesh (IN); Ayyappa Reddy Jakkireddy, Telangana (IN); Guru Moorthy Kurra, Telangana (IN); Lenin Pokkula, Telangana (IN); Steven Edward Meiners, Fuquay Varina, NC (US)

(73) Assignee: ABB Schweiz AG, Baden (CH)

( * ) Notice: Subject to any disclaimer, the term of this patent is extended or adjusted under 35 U.S.C. 154(b) by 523 days.

This patent is subject to a terminal disclaimer.

(21) Appl. No.: 14/626,154

(22) Filed: Feb. 19, 2015

(65) Prior Publication Data

US 2016/0248234 A1    Aug. 25, 2016

(51) Int. Cl.
    *H02B 1/56*      (2006.01)
    *H02B 13/025*    (2006.01)
    *H02B 1/30*      (2006.01)

(52) U.S. Cl.
    CPC .............. *H02B 1/565* (2013.01); *H02B 1/30* (2013.01); *H02B 13/025* (2013.01)

(58) Field of Classification Search
    CPC ......... H02B 1/565; H02B 1/30; H02B 13/025
    (Continued)

(56) References Cited

U.S. PATENT DOCUMENTS 5,574,624 A    11/1996    Rennie et al.
5,689,097 A *  11/1997    Aufermann ............ H02B 1/565
                                                     218/157
(Continued)

FOREIGN PATENT DOCUMENTS

CN      2245284 Y      1/1997
CN      202977342 U    6/2013
(Continued)

OTHER PUBLICATIONS

ELGA Electrical Distribution Equipment, "Metal-Clad Type Switchgear"; brochure USN-common—Rev. 0.1-EN-2010.04; 2 pages.

(Continued)

*Primary Examiner* — Steven B McAllister
*Assistant Examiner* — Allen R Schult
(74) *Attorney, Agent, or Firm* — Barnes & Thornburg LLP

(57) ABSTRACT

A switchgear enclosure includes an exterior housing. A plurality of compartments within the exterior housing includes at least a first switching device compartment, a bus compartment, and a first cable compartment. A plurality of interior partitions arranged to subdivide the exterior housing into the plurality of compartments includes at least a first partition between the first switching device compartment and the first cable compartment, and a second partition between the bus compartment and the first cable compartment. An exhaust system includes a vent path structure arranged within the exterior housing to at least partially surround the bus compartment and the first cable compartment, a channel formed between the vent path structure and the exterior housing, and a first vent device in the first partition. The first vent device is configured to fluidically (Continued)

connect the first switching device compartment to the channel via the vent path structure.

17 Claims, 11 Drawing Sheets

(58) Field of Classification Search
USPC .......................................................... 454/184
See application file for complete search history.

(56) References Cited

U.S. PATENT DOCUMENTS

| | | | | |
|---|---|---|---|---|
| 6,417,443 | B1* | 7/2002 | Smith | H02B 1/565 |
| | | | | 174/17 VA |
| 2013/0327623 | A1* | 12/2013 | Kozuru | H02B 13/025 |
| | | | | 200/5 B |
| 2015/0372463 | A1* | 12/2015 | Prakash | H02B 1/565 |
| | | | | 361/611 |

FOREIGN PATENT DOCUMENTS

| | | |
|---|---|---|
| CN | 103444026 A | 12/2013 |
| CN | 103444029 A | 12/2013 |
| CN | 203734167 U | 7/2014 |
| CN | 105281212 A | 1/2016 |
| DE | 29622654 U1 | 5/1997 |
| DE | 10291133 B4 | 10/2011 |
| DE | 102010034264 B3 | 2/2012 |
| EP | 2455957 A1 | 5/2012 |
| EP | 2501001 A1 | 9/2012 |
| EP | 1806760 B1 | 12/2013 |
| JP | S5880715 U | 6/1983 |
| JP | S59119707 U | 8/1984 |
| JP | S62145407 U | 12/1987 |
| WO | 2001071868 A1 | 9/2001 |
| WO | 2075760 A1 | 9/2002 |

OTHER PUBLICATIONS

Federal Pacific, "Type PSI/II Manual: Live-Front pad-mounted switchgear"; pp. 9-30.
Siemens, Haymarket gas insulated switchgear (GIS) substation design and construction, Jan. 1, 2008 (Jan. 1, 2008) [retrieved on Feb. 19, 2015 (Feb. 19, 2015)]. Retrieved from internet: URL: http://www.siemens.com.au/news/news-centre-2008-ss_haymarket-gas.
First Office Action issued by CNIPA for corresponding CN Application No. 201610094558.X, dated Aug. 2, 2018, 21 pages (including translation).
"Haymarket gas insulated switchgear (GIS) substation design and construction", Siemens, Jan. 10, 2008.
"Metal-Clad Type Switchgear", Electrical Distribution Equipment, 2 Pages.
"Type PSI/II Manual Live-Front pad-mounted switchgear", pp. 9-30.
European Search Report Opinion issued in connection with corresponding EP Application No. 16154919.1 dated Jun. 29, 2016.

* cited by examiner

US 10,431,963 B2

EXHAUST SYSTEM FOR SWITCHGEAR ENCLOSURE, AND SWITCHGEAR ENCLOSURE HAVING THE SAME

BACKGROUND OF THE INVENTION

The subject matter disclosed herein relates to switchgear, and more particularly relates to a switchgear enclosure having an exhaust system.

Switchgear, such as medium voltage ("MV") switchgear, includes various components secured within an enclosed structure. The switchgear enclosure is divided into compartments, such as one or more circuit breaker compartments each housing a circuit breaker, a bus bar compartment housing a bus bar system, and one or more cable connection compartments. The circuit breakers in the circuit breaker compartments can be electrically connected to the bus bar system in the bus bar compartment via spouts.

If an arc occurs, such as if a voltage between the conductors within the switchgear exceeds the insulative properties of the insulation between the conductors, or if the conductors are positioned too closely together, an arc flash can release significant energy in the form of heat, intense light, pressure waves, and/or sound waves, sufficient to damage the conductors and adjacent equipment of the switchgear. Current structure for limiting the effects of an arc flash include providing thicker steel sheeting to the switchgear enclosure, and exhausting arc gases from the interior of the switchgear enclosure through an opening at the top of the switchgear enclosure.

BRIEF DESCRIPTION OF THE INVENTION

According to one aspect of the invention, a switchgear enclosure includes an exterior housing, a plurality of compartments within the exterior housing, a plurality of interior partitions arranged to subdivide the exterior housing into the plurality of compartments, and an exhaust system. The plurality of compartments includes at least a first switching device compartment, a bus compartment, and a first cable compartment. The plurality of interior partitions include at least a first partition between the first switching device compartment and the first cable compartment, and a second partition between the bus compartment and the first cable compartment. The exhaust system includes a vent path structure arranged within the exterior housing to at least partially surround the bus compartment and the first cable compartment, a channel formed between the vent path structure and the exterior housing, and a first vent device in the first partition. The first vent device is configured to fluidically connect the first switching device compartment to the channel via the vent path structure.

According to another aspect of the invention, an exhaust system is disposable within a switchgear enclosure. The exhaust system includes first and second opposing vent path sides, each including a substantially U-shaped cross-section to direct arc gases, a third vent path side connected to each of the first and second vent path sides, the third vent path side arranged to direct arc gases to the first and second vent path sides, and a fourth vent path side connected to each of the first and second vent path sides and opposing the third vent path side, the fourth vent path side arranged to direct arc gases to the first and second vent path sides.

According to yet another aspect of the invention, a switchgear enclosure includes an exterior housing including first and second opposing walls, third and fourth opposing walls, and fifth and sixth opposing walls. The switchgear enclosure further includes an exhaust system. The exhaust system is disposable within a switchgear enclosure. The exhaust system includes first and second opposing vent path sides, each including a substantially U-shaped cross-section to direct arc gases, a third vent path side connected to each of the first and second vent path sides, the third vent path side arranged to direct arc gases to the first and second vent path sides, and a fourth vent path side connected to each of the first and second vent path sides and opposing the third vent path side, the fourth vent path side arranged to direct arc gases to the first and second vent path sides. The exhaust system is disposed within the exterior housing. The first vent path side at least partially encloses a space between the first vent path side and the first wall, and the second vent path side at least partially encloses a space between the second vent path side and the second wall.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
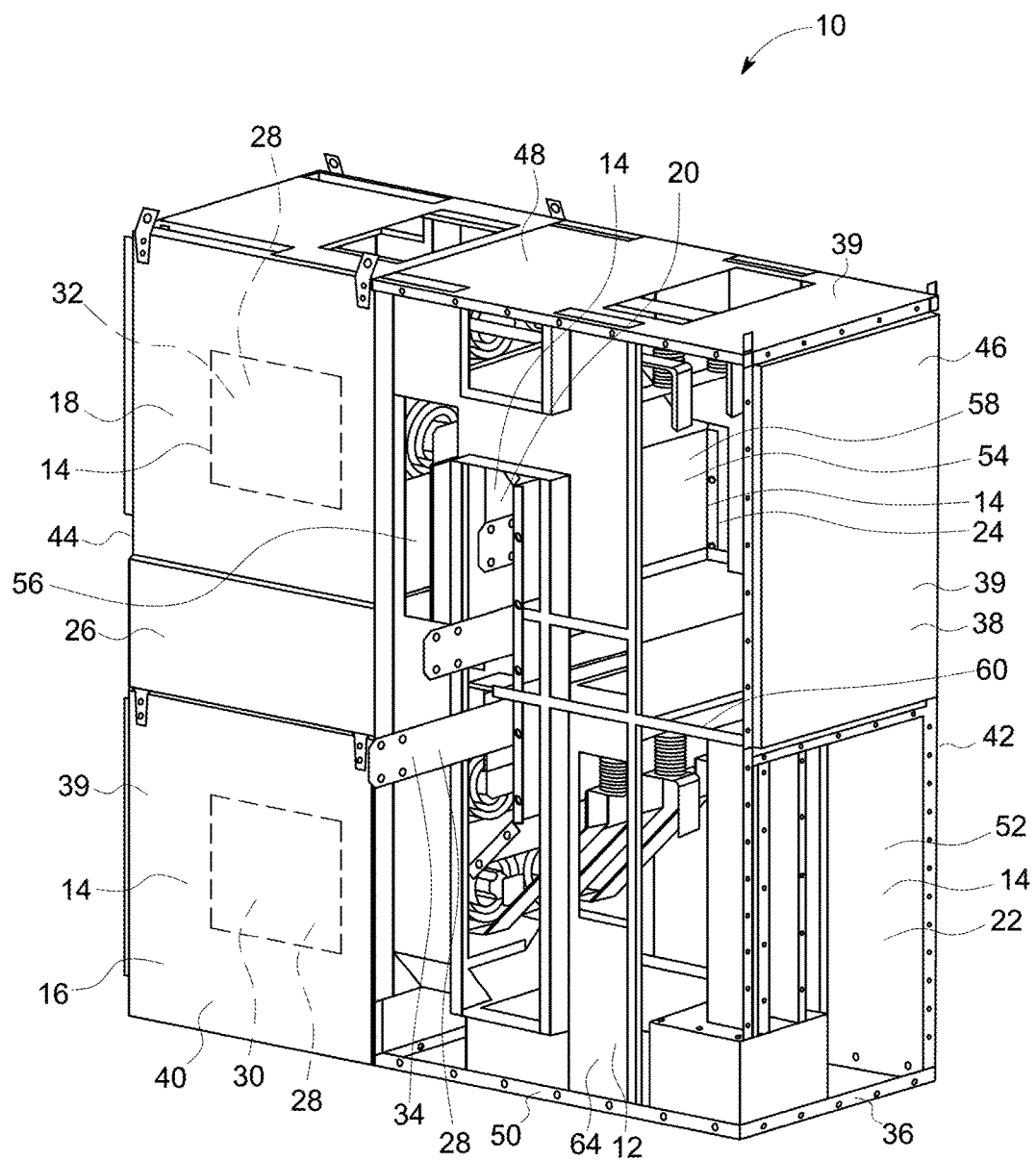
FIG. 1 is a perspective, partially exposed view of one embodiment of a switchgear.

FIG. 1 illustrates one embodiment of an arc resistant switchgear 10 with an exhaust system 12 to exhaust from multiple compartments 14 to atmosphere. The multiple compartments 14 include a first (lower) switching device compartment 16, a second (upper) switching device compartment 18, a bus compartment 20, a first (lower) cable compartment 22, and a second (upper) cable compartment 24. The switching devices in the first and second switching device compartments 16, 18 are preferably circuit breakers, and therefore the switching device compartments 16, 18 can serve as circuit breaker compartments. The bus compartment 20 is disposed between the first switching device compartment 16 and the first cable compartment 22, and between the second switching device compartment 18 and the second cable compartment 24. A low voltage compartment 26 may also be interposed between the first and second switching device compartments 16, 18. Components 28 that may be used within the switchgear 10 include first and second circuit breakers 30, 32, disposed in the first and second switching device compartments 16, 18, a bus bar system 34 within the bus compartment 20, and cables (not shown) in the first and second cable compartments 22, 24. The first and second circuit breakers 30, 32 may include wheels so that they can be rolled into and out of their respective compartments 16, 18. The low-voltage compartment 26 may be provided adjacent a front door of the switchgear 10 for equipment such as relays, meter, lights, and switches.

The switchgear 10 includes a switchgear enclosure 36 having an exterior housing 38, interior partitions 54, and the exhaust system 12. The exterior housing 38 of the illustrated switchgear enclosure 36 has a rectangular prism shape with panels 39 for a first wall 40 (side), second wall 42 (opposite first wall 40), third wall 44 (front), fourth wall 46 (rear), fifth wall 48 (top), and sixth wall 50 (bottom). Due to the typical size of the switchgear enclosure 36, each wall 40, 42, 44, 46, 48, 50 of the exterior housing 38 may include two or more panels 39 as required for structural rigidity. Some of the panels 39 are shown in FIG. 1, and some of the panels 39 are removed from view to expose an interior 52 of the switchgear enclosure 36. That is, for illustrative purposes, some of the exterior panels 39 are removed from view to depict the exhaust system 12 within the switchgear enclosure 36, however it should be understood that during use the exterior panels 39 for each wall 40, 42, 44, 46, 48, 50 of the enclosure 36 would be in place such that the switchgear enclosure 36 encloses the components 28 of the switchgear 10 therein. Also, some of the walls 40, 42, 44, 46, 48, 50 may include doors, flappers, apertures, access panels, attachment devices and other features associated with switchgear enclosures 36. The interior 52 of the illustrated switchgear enclosure 36 includes interior partitions 54 for dividing adjacent compartments 14 from each other. The interior partitions 54 include at least a partition 56 arranged to separate the first and second switching device compartments 16, 18 from the bus compartment 20 and the first and second cable compartments 22, 24, a partition 58 arranged to separate the bus compartment from the first and second cable compartments, a partition 60 arranged to separate the first cable compartment 22 from the second cable compartment 24, and a partition 62 (FIG. 10) arranged to separate the first switching device compartment 16 from the second switching device compartment 18 (or from the low voltage compartment 26 interposed between the first and second switching device compartments 16, 18). Also, as noted above, the switchgear enclosure 36 includes the exhaust system 12 as will be further described below.

With reference again to FIG. 1, the exhaust system 12 is designed and placed in the switchgear housing 38 in such a way that, in an event of internal arc, the high pressure and temperature gases are guided through a complex network of passages and channels inside the switchgear 10 so that it can be safely exhausted without creating a high pressure and temperature environment inside the switchgear enclosure 36. The exhaust system 12 is designed in such a way that multiple compartments 14 during an arcing event can be employed at the same time to share the pressure and exhaust the high pressure and temperature gases to outside atmosphere, thus mitigating potential damage to the switchgear 10 and limiting the possibility of danger to personnel in proximity. The exhaust system 12 further assists in limiting the escape of arc gases to adjacent compartments 14 by utilizing channels as will be described below.

Figure 2:
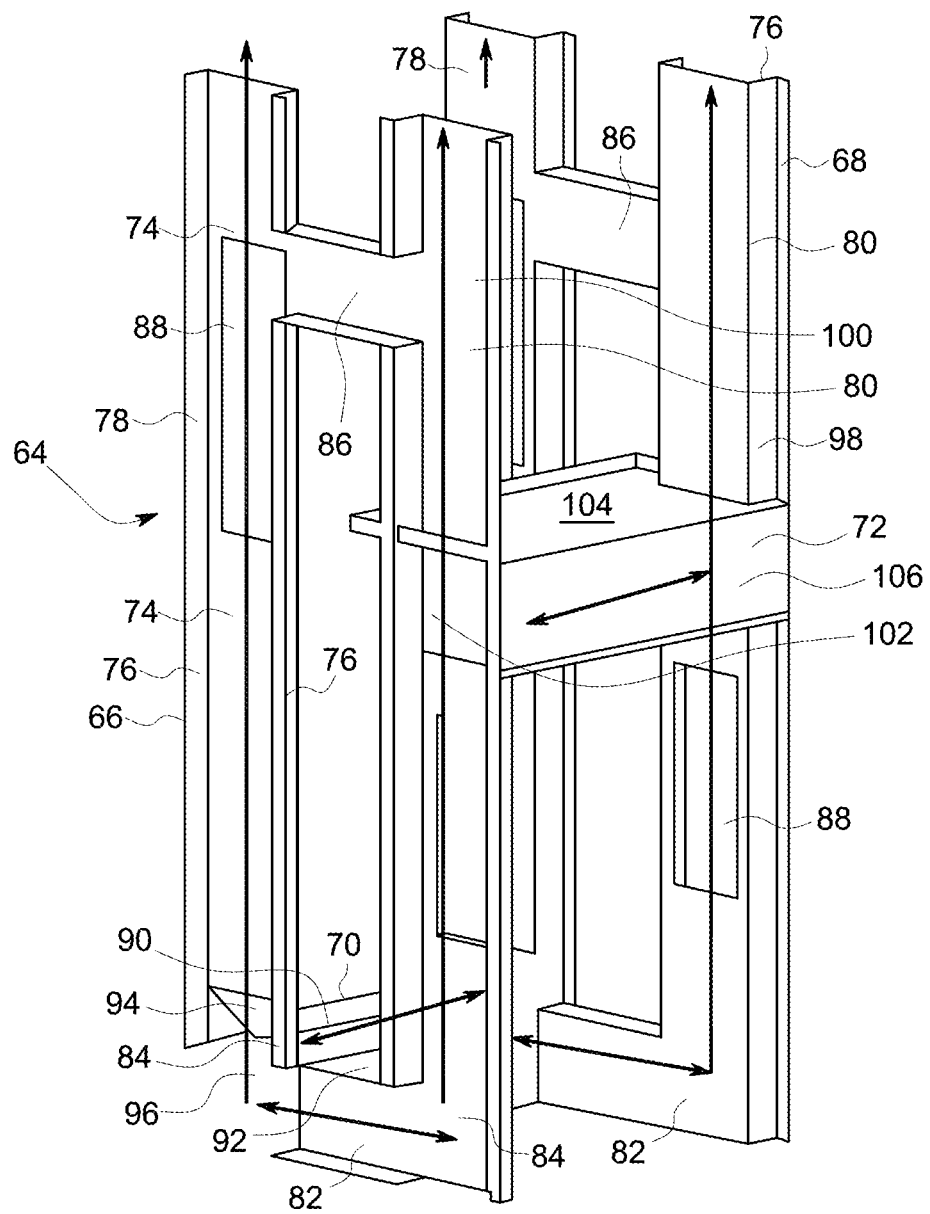
FIG. 2 is a perspective view of one embodiment of a vent path structure for use in the switchgear of FIG. 1.
Figure 3:
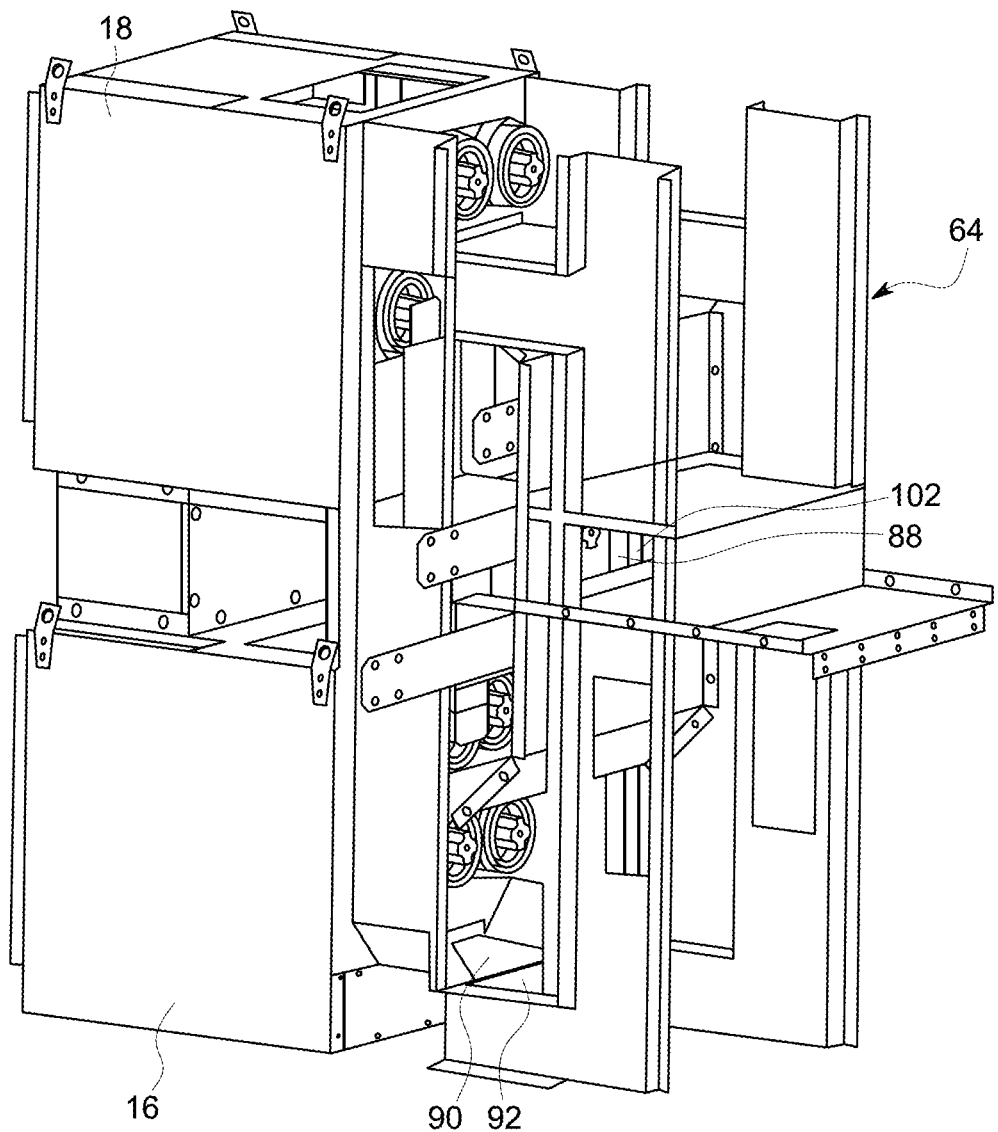
FIG. 3 is a perspective view of the vent path structure of FIG. 2 assembled onto a portion of the switchgear of FIG. 1.
Figure 4:
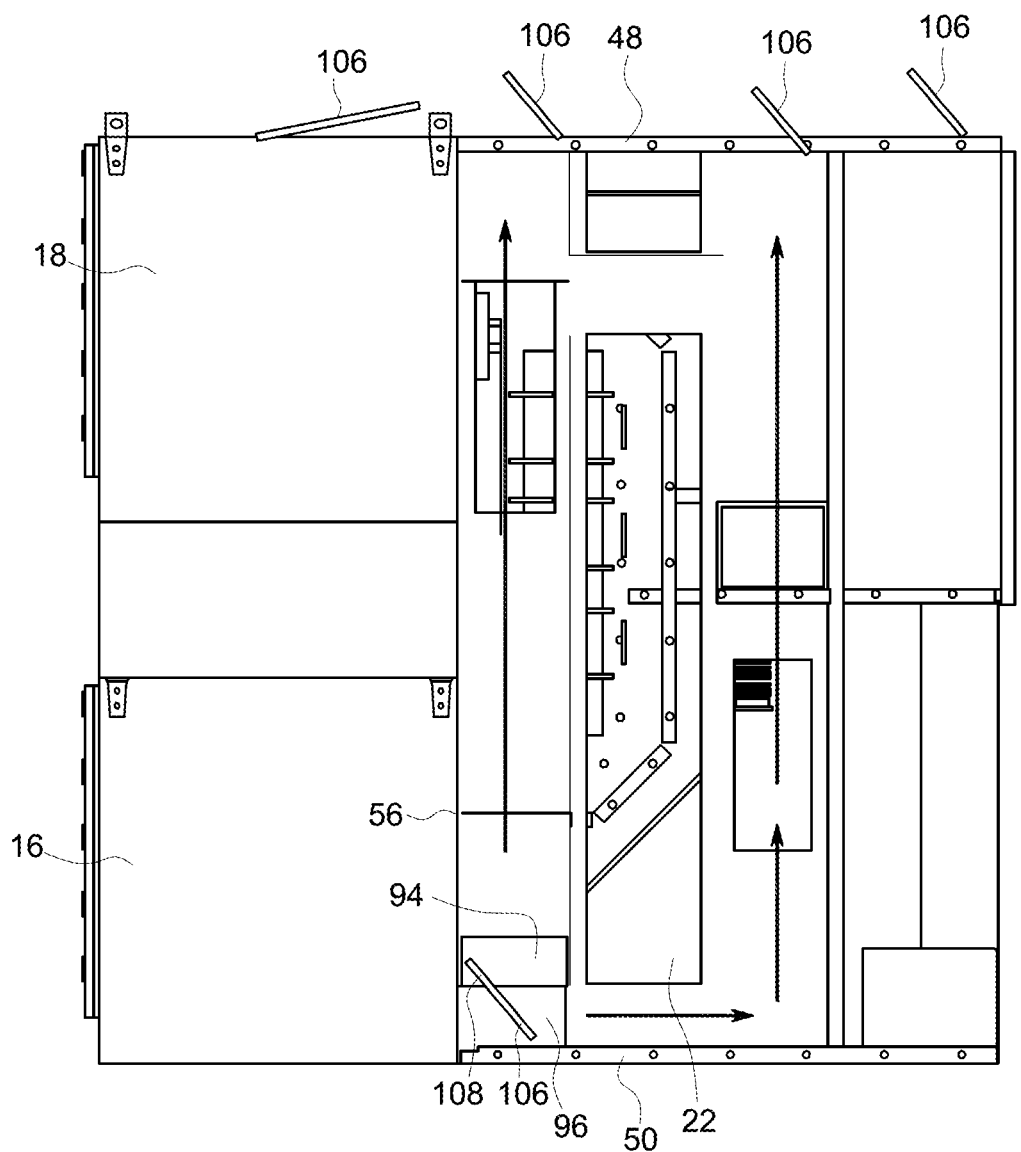
FIG. 4 is a side plan, partially exposed view of the switchgear of FIG. 1.
Figure 10:
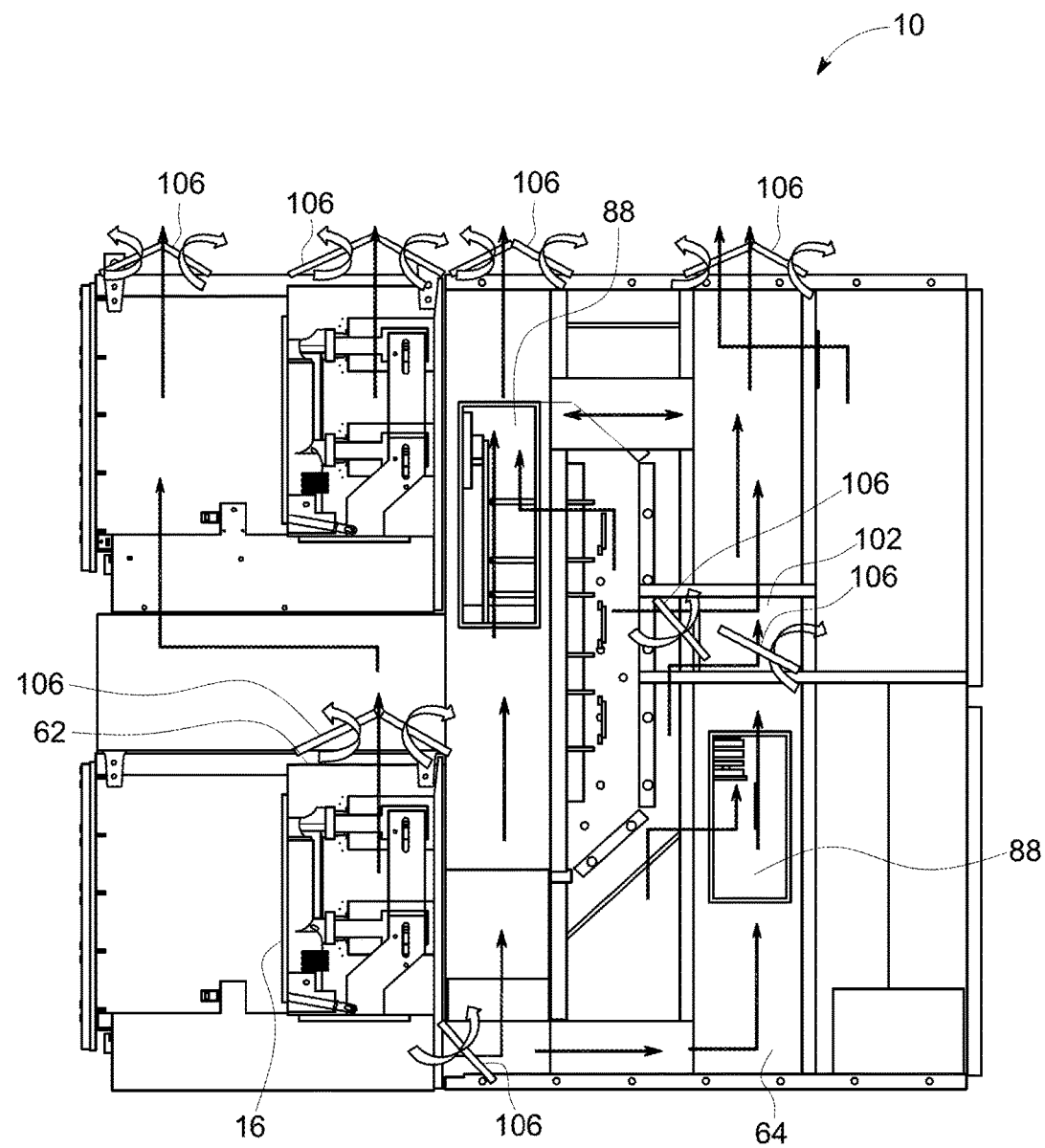

The exhaust system 12 includes a universal vent path structure 64, shown outside of the switchgear enclosure 36 in FIG. 2, that can be added to the rear of the first and second switching device compartments 16, 18 as shown in FIG. 3, and partially surround sides of the bus compartment 20 and the first and second cable compartments 22, 24 (FIG. 1). While features of the universal vent path structure 64 will be separately described below, the universal vent path structure 64 may be a modular structure that can be inserted into the switchgear 10 as an integral unit. The vent path structure 64 is attached to the first switching device compartment 16 and other compartments 14 of the switchgear 10 in such a way that guides the exhaust pressure gases through a flap or any other pre-defined opening mechanism, such as vent device 106 (FIG. 4), to the entry point at an adjacent compartment 14 in the switchgear 10. As can be seen in FIGS. 1, 4, and 10, when the vent path structure 64 is arranged within the exterior housing and attached to the first switching device compartment 16, it extends from the first switching device compartment 16 and past the bus compartment 20 and cable compartment 22. Arrows indicating the paths for the arc gases received from the first switching device compartment 16 via vent device 106 through the channel are shown.

With further reference to FIG. 2, one embodiment of the universal vent path structure 64 of the exhaust system 12 includes first and second opposing vent path sides 66, 68, a third vent path side 70 connected to each of the first and second vent path sides 66, 68, and a fourth vent path side 72 connected to each of the first and second vent path sides 66, 68. The first and second opposing vent path sides 66, 68 each include a substantially U-shaped cross-section to direct arc gases, such as by including a plate-like portion 74 with two protruding ridges 76 on longitudinal sides of the plate-like portion 74. When the first vent path side 66 is positioned adjacent the first side wall 40 of the exterior housing 38, a space is enclosed between the first side wall 40 and the U-shape of the first vent path side 66 to form a channel 74 that extends substantially from the bottom wall 50 to the top wall 48 of the exterior housing 38. Likewise, when the second vent path side 68 is positioned adjacent the second side wall 42 of the exterior housing 38, a space is enclosed between the second side wall 42 and the U-shape of the second vent path side 68 to form a channel 76 that extends substantially from the bottom wall 50 to the top wall 48 of the exterior housing 38. The first and second opposing vent path sides 66, 68 also may each include first and second substantially longitudinally extending parallel portions 78, 80 and a third portion 82 connected to the first and second portions 78, 80 to fluidically connect the channels 74, 76 of the first and second portions 78, 80. The third portion 82 may extend substantially perpendicular to the first and second portions 78, 80 as shown. The third portion 82 is connected to bottom end areas 84 of the first and second portions 78, 80. The first and second vent path sides 66, 68 may further include a fourth portion 86 spaced from the third portion 82 and which also fluidically connects the first and second portions 78, 80. The first portion 78 may be spaced from the bottom wall 50, as will be further described below. The first and second portions 78, 80 may further include apertures 88 for enabling arc gases to vent from the compartments 14 to the channels 74, 76 defined between the first and second vent path sides 66, 68 and the first and second walls 40, 42.

The third vent path side 70 connects the first portions 78 of the first and second vent path sides 66, 68. The third vent path side 70 extends substantially parallel to the third and fourth walls 44, 46 of the exterior housing 38. The third vent path side 70 is connected to an end area 84 of the first portions 78 of the first and second vent path sides 66, 68, adjacent the bottom wall 50. In use, the third vent path side 70 is disposed in the first cable compartment 22. The third vent path side 70 includes a first barrier section 90 substantially parallel to the top and bottom walls 48, 50, and a second barrier section 92 substantially parallel to the front and rear walls 44, 46. There may further be one or more transition sections 94 between the first and second vent path sides 66, 68 and the third vent path side 70. The third vent path side 70 is thus arranged to at least partially form a channel 96 between the third vent path side 70 and the sixth wall 50, and the channel 96 is fluidically connected to the channels 74, 76 between the first and second vent path sides 66, 68 and the first and second side walls 40, 42, respectively.

The fourth vent path side 72 is connected to a central area 98 of the second portions 80 of the first and second vent path sides 66, 68. The central area 98 of the second portions 80 of the first and second vent path sides 66, 68 is located between the end area 84 of the second portions 80 to which the third portion 82 is connected, and the area 100 of the second portions 80 to which the fourth portion 86 is connected. The fourth vent path side 72 fluidically connects the second portions 80 of the first and second vent path sides 66, 68 via apertures 102 in the second portions 80. In use, the fourth vent path side 72 is disposed in the second cable compartment 24. The fourth vent path side 72 includes a first barrier section 104 substantially parallel to the fifth and sixth walls 48, 50, and a second barrier section 106 substantially parallel to the third and fourth walls 44, 46.

Figure 5:
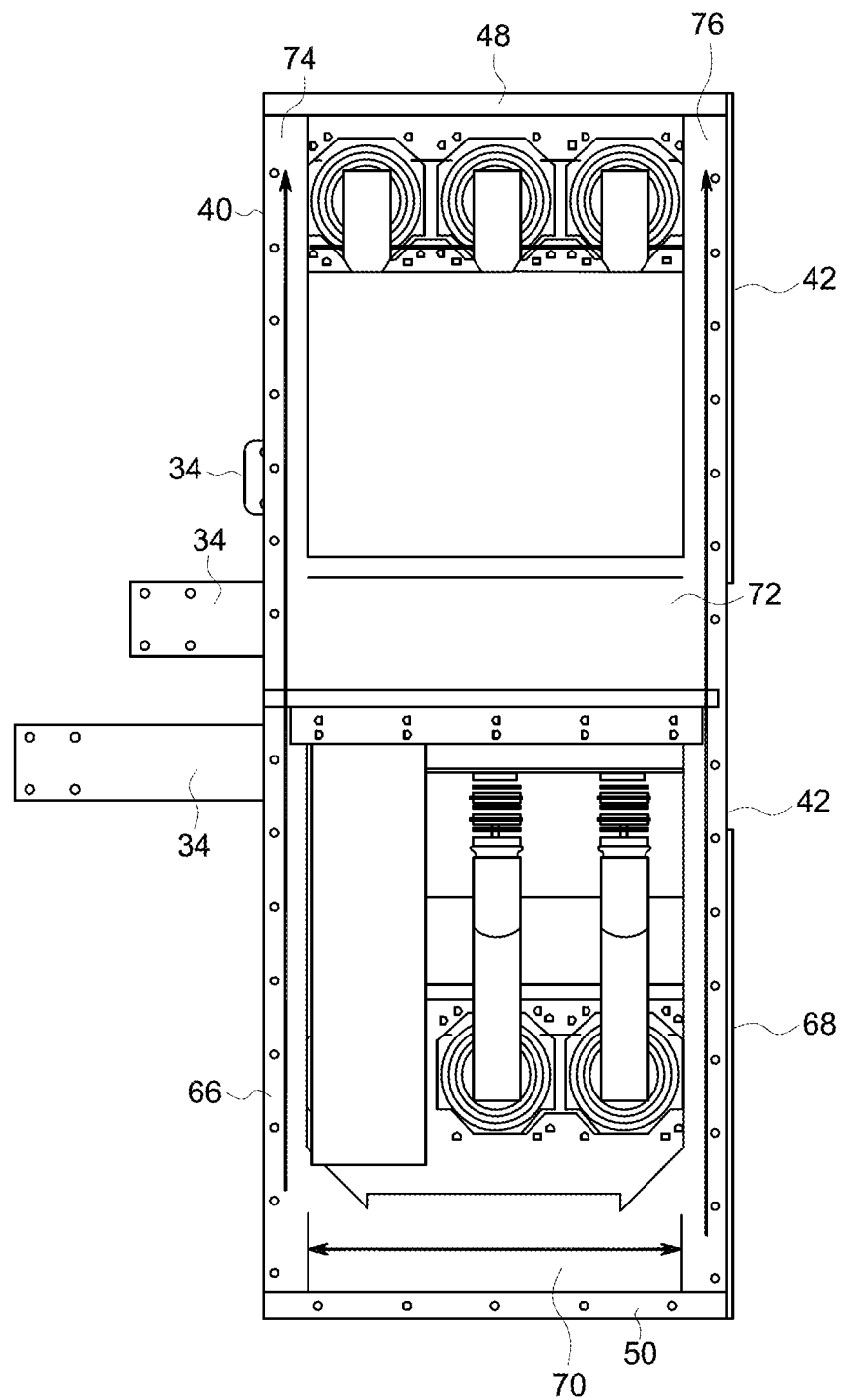
FIG. 5 is a rear plan view of FIG. 4 schematically illustrating release of arc gases from a first switching device compartment of the switchgear of FIG. 1.
Figure 11:
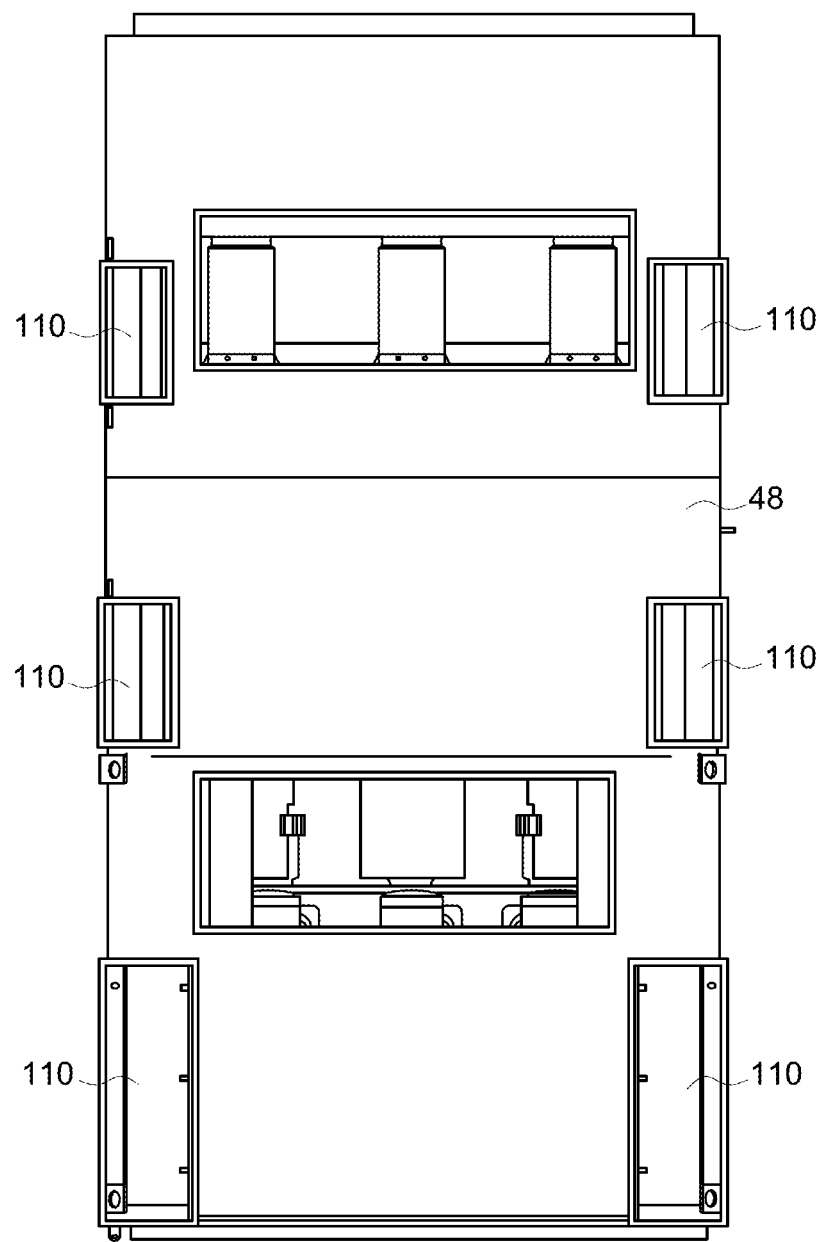
FIG. 11 is a top plan view of FIG. 10.

For venting arc gases from the first switching device compartment 16, such as demonstrated by FIGS. 4 and 5, the interior partition 56 between the first switching device compartment 16 and the first cable compartment 22 is provided with a movable vent device 106. In one embodiment, the movable vent device 106 includes a hinged flap 108 as shown, however in alternative embodiments the movable vent device 106 may include a spring biased venting structure or other venting devices. The movable vent device 106 is at least substantially aligned with the third vent path side 70 such that when in an open condition to release arc gases from the first switching device compartment 16, the arc gases travel from the channel 96 between the third vent path side 70 and the sixth wall 50 and into the channels 74, 76 between the first and second vent path sides 66, 68 and the first and second side walls 40, 42, respectively. Arc gases travelling through the channels 74, 76 will escape the switchgear 10 to the outside atmosphere via openings 110 (FIG. 11) in the fifth wall 48 that are at least substantially aligned with the channels 74, 76. The openings 110 may also be provided with movable vent devices 106 such as, but not limited to, flappers 108. As further shown in FIG. 10, the arc gases may also release the first switching device compartment 16 from a movable vent device 106 in the partition 62 above the first switching device compartment 16, and then another opening or openings 110 in the fifth wall 48 above the second switching device compartment 18. Thus, the release of the arc gases from the first switching device compartment 16 may be shared between various compartments 14, but directed away from the components 28 within the compartments 14. Arrows indicating paths for the arc gases to release from the switchgear 10 are shown.

Figure 6:
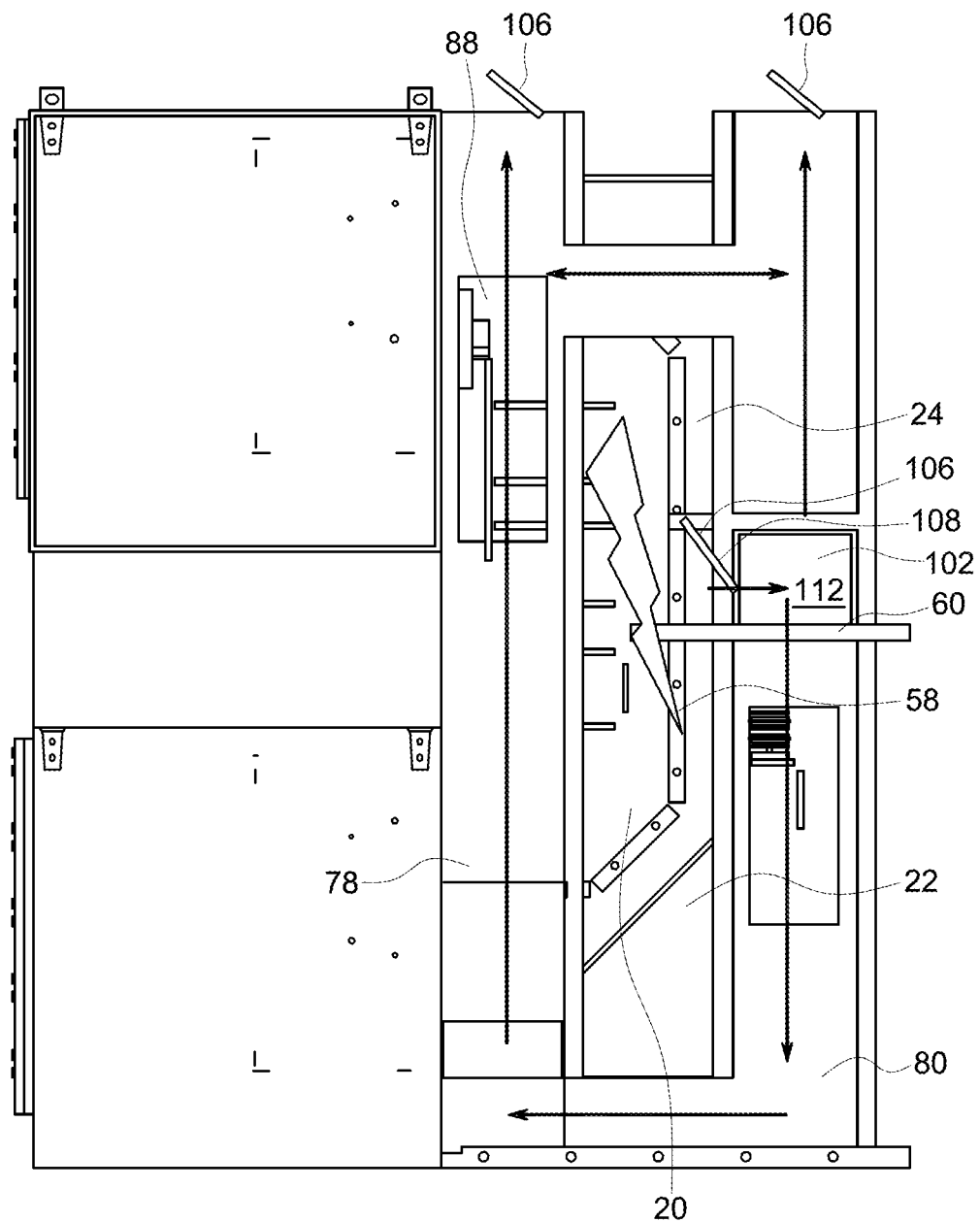
FIG. 6 is a side plan, partially exposed view of the switchgear of FIG. 1.
Figure 7:
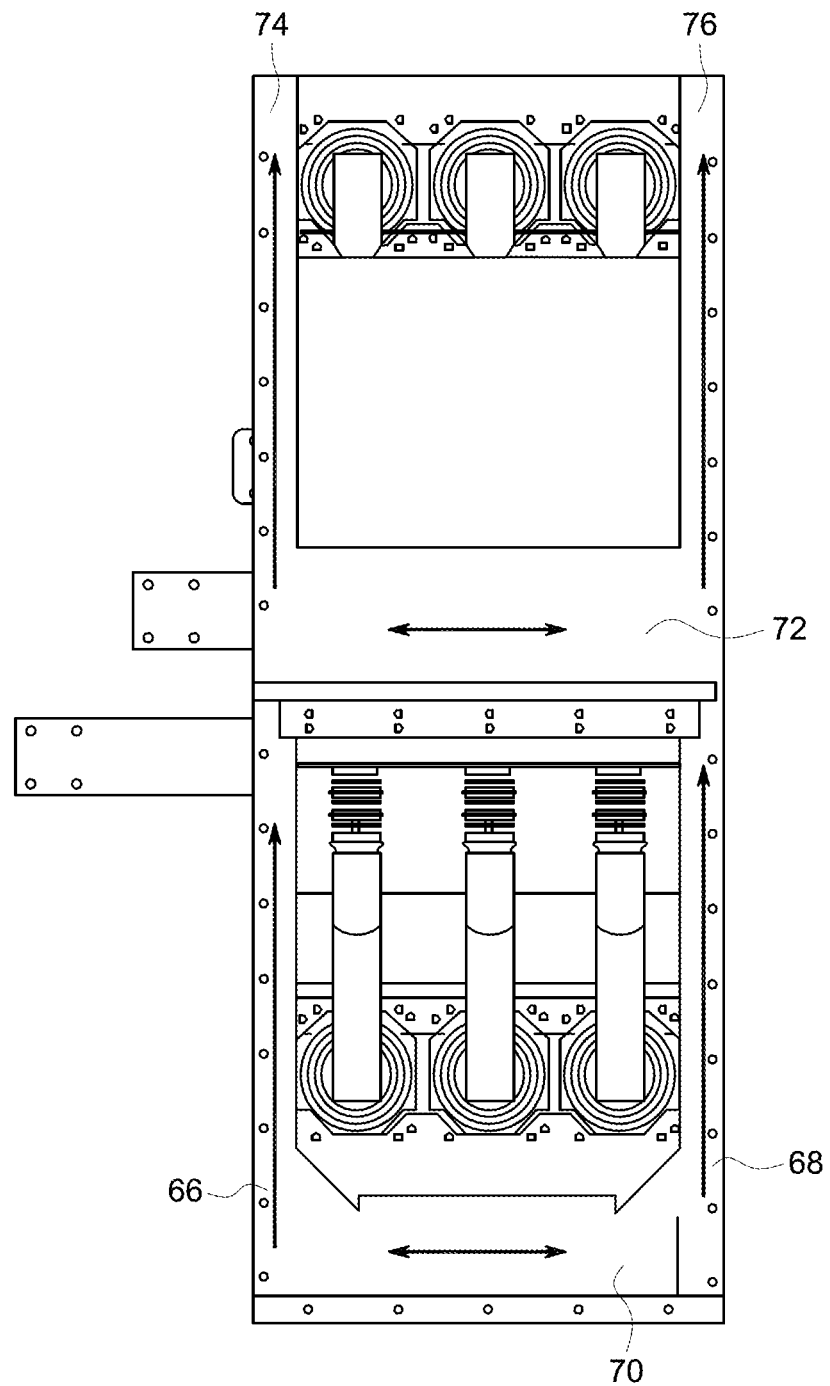
FIG. 7 is a rear plan view of FIG. 6 schematically illustrating release of arc gases from a bus compartment of the switchgear of FIG. 1.

For venting arc gases from the bus compartment 20, as shown in FIGS. 6 and 7, the interior partition 58 between the bus compartment 20 and the first and second cable compartments 22, 24 is provided with a movable vent device 106. In one embodiment, the movable vent device 106 includes a hinged flap 108 as shown, however in alternative embodiments the movable vent device 106 may include a spring biased venting structure or other venting devices. The movable vent device 106 is at least substantially aligned with the fourth vent path side 72 such that when in an open condition to release arc gases from the bus compartment 20, the arc gases travel from the channel 112 between the fourth vent path side 72 and the partition 60 between the first and second cable compartments 22, 24, through the apertures 102 in the second portions 80 of the first and second vent path sides 66, 68, and into the channels 74, 76 between the first and second vent path sides 66, 68 and the first and second side walls 40, 42, respectively. Arc gases travelling through the channels 74, 76 will escape the switchgear 10 to the outside atmosphere via openings 110 in the fifth wall 48 that are at least substantially aligned with the channels 74, 76. The openings 110 may also be provided with movable vent devices 106 such as flappers 108. In addition to release through the movable vent device 106, arc gases from the bus compartment 20 may be released through the apertures 88 in the first portions 78 of the first and second vent path sides 66, 68, which are aligned with the bus compartment 20. Thus, the release of the arc gases from the bus compartment 20 is shared between various compartments 14, but directed away from cable compartments 22, 24 and the components 28 therein.

Figure 8:
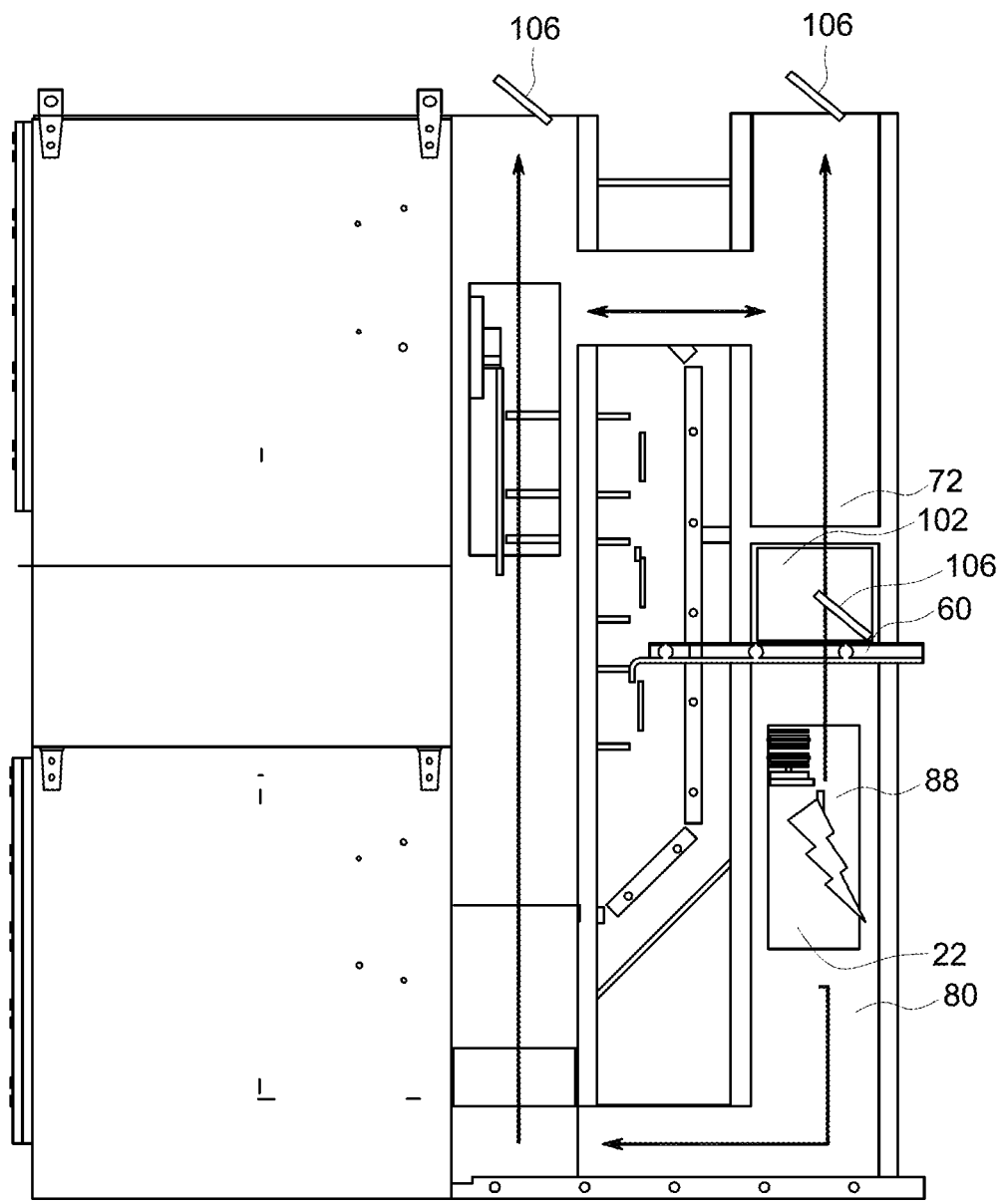
FIG. 8 is a side plan, partially exposed view of the switchgear of FIG. 1.
Figure 9:
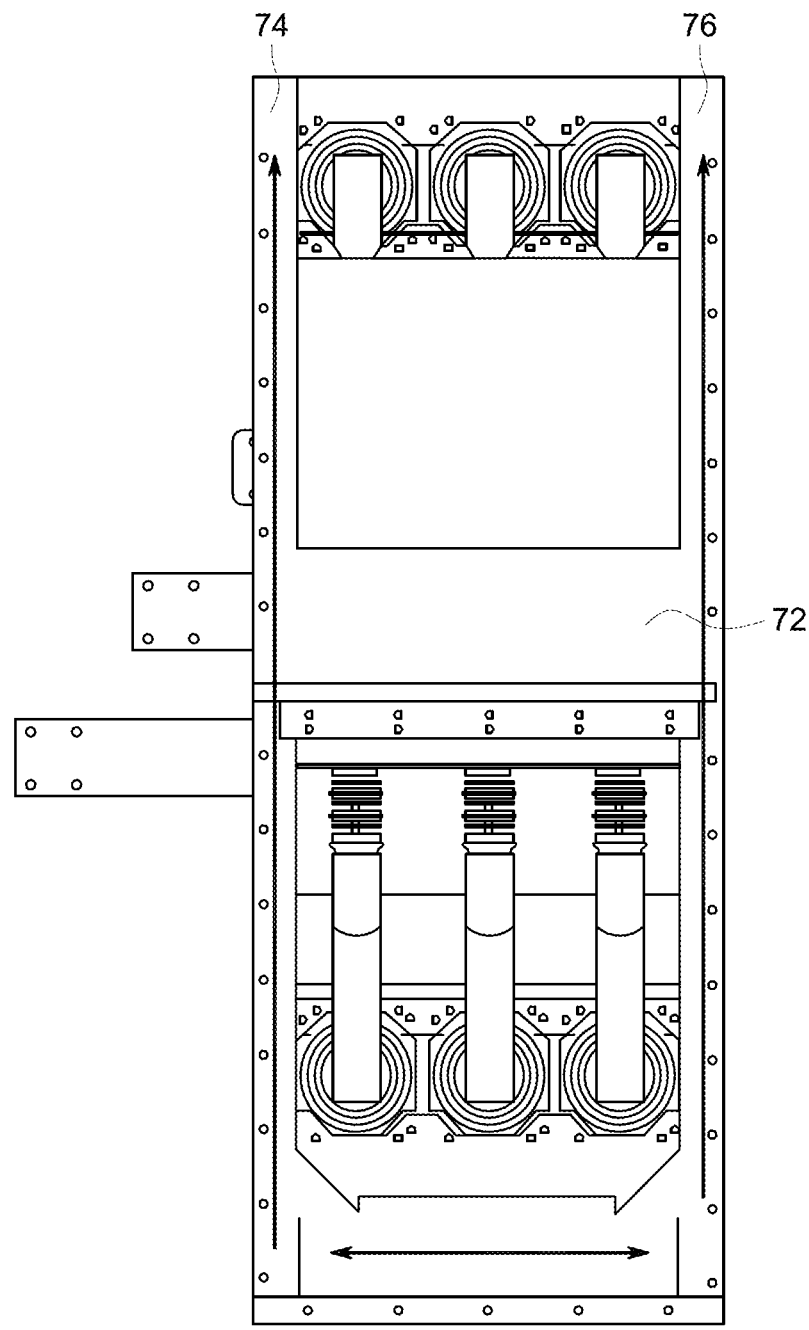
FIG. 9 is a rear plan view of FIG. 8 schematically illustrating release of arc gases from a first cable compartment of the switchgear of FIG. 1; and, FIG. 10 is a side plan, partially exposed view of the switchgear of FIG. 1 schematically illustrating release of arc gases from all compartments of the switchgear of FIG. 1.

For venting arc gases from the first cable compartment 22, as shown in FIGS. 8 and 9, the interior partition 60 between the first cable compartment 22 and the second cable compartment 24 is provided with a movable vent device 106. In one embodiment, the movable vent device 108 includes a hinged flap 108 as shown, however in alternative embodiments the movable vent device 106 may include a spring biased venting structure or other venting devices. The movable vent device 106 is at least substantially aligned with the fourth vent path side 72 such that when in an open condition to release arc gases from the first cable compartment 22, the arc gases travel from the channel 112 between the fourth vent path side 72 and the partition 60, through the apertures 102 in the second portions 80 of the first and second vent path sides 66, 68, and into the channels 74, 76 between the first and second vent path sides 66, 68 and the first and second side walls 40, 42, respectively. Arc gases travelling through the channels 74, 76 will escape the switchgear 10 to the outside atmosphere via openings 110 in the fifth wall 48 that are at least substantially aligned with the channels 74, 76. The openings 110 may also be provided with movable vent devices 106 such as flappers 108. In addition to release through the movable vent device 106, arc gases from the first cable compartment 22 may be released through the apertures 88 in the second portions 80 of the first and second vent path sides 66, 68. Thus, the release of the arc gases from the first cable compartment 22 is shared between various compartments 14, but directed away from the components 28 within the compartments 14.

FIG. 10 demonstrates an embodiment of the exhaust system 12 including the universal vent path structure 64 and an arrangement of movable vent devices 106 in the switchgear 10. For the first switching device compartment 16, bus compartment 20, and first cable compartment 22, the entry point into the vent path structure 64 is designed in such a way that during the arc event in any of the compartments 14, pressure or gas would be released through the complex network of passages/channels and exhaust at the top of the switchgear 10 from where gas could be easily released in a safe atmosphere via a duct or skirt (not shown) on the top of the switchgear 10. The exhaust system 12 redistributes the pressure build up on the other parts or available volume section of the rest of the switchgear 10. The exhaust system 12 works as a channel to redistribute the pressure in all available sections of the switchgear 10 in uniform fashion and exhaust in a safe manner without causing danger to the equipment and person in proximity. That is, the exhaust system 12 channels the energy released during an internal arc fault in ways that reduce the potential for damage to surrounding equipment. Each of the second switching device compartment 18 and the second cable compartment 22 may expel arc gases through the fifth wall 48 via openings or movable vent devices 106. Each of the first switching device compartment 16, first cable compartment 22, and bus compartment 20 is provided with at least two separate exits for arc gases. That is, arc gases from the first switching device compartment 16 can escape through both the vent device 106 in the partition 62 and the vent device 106 leading to the channel 96. Arc gases from the bus compartment 20 can escape through the aperture 88 in the first portions 78 as well as through the vent device 106 leading to channel 112. Arc gases from the first cable compartment 22 can escape through the aperture 88 in the second portions 80 as well as through the vent device 106 leading to channel 112. Thus, arc gases are redistributed for faster escape from the switchgear 10.

Unless the switchgear 10 is provided at a location where site conditions allow for free expansion and travel of gas and material without interference of adjacent equipment and where personnel exposure is very limited, a top mounted plenum may be employed on the switchgear 10. The plenum is exteriorly installed on top of the switchgear enclosure 36 (along the fifth wall 48) to lead to a duct to direct arc gases to outside atmosphere, such that the plenum directs the arc flash away from the switchgear 10 to a safe external atmosphere. The continuous overhead plenum installed along the top of the switchgear 10 provides both safe expansion volume and a directed flow path for gas, smoke, and debris in the event of an arcing fault. One or more exhaust ducts are included to allow a path to a safe exterior environment for exhaust dissipation.

The switchgear enclosure 36 may be a modular design, which can be assembled in a breakdown assembly sequence and include add-on blocks of pre-fabricated sub assembly to complete the switchgear 10. In particular, the vent path structure 64 may be added as a modular unit sub-assembly into the exterior housing 38 to complete the exhaust system 12 with the movable vent devices 106 and interior partitions 54.

The use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item. While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A switchgear enclosure comprising:
an exterior housing;
a plurality of compartments within the exterior housing, the plurality of compartments including at least a first switching device compartment, a bus compartment, and a first cable compartment;
a plurality of interior partitions arranged to subdivide the exterior housing into the plurality of compartments, the interior partitions including at least (i) a first partition between the first switching device compartment and the first cable compartment and (ii) a second partition between the bus compartment and the first cable compartment; and
an exhaust system including:
a vent path structure coupled within the exterior housing to define a channel between the vent path structure and the exterior housing, at least a portion of the channel defining a first vent path between the first switching device compartment and an opening formed in the exterior housing to vent arc gases from the first switching device compartment and to the opening; and
a first vent device in the first partition, the first vent device configured to fluidically connect the first switching device compartment to the channel;
wherein at least a portion of the channel defines a second vent path between the bus compartment and the opening, the exhaust system further includes a second vent device in the second partition, and the second vent device is configured to fluidically connect the bus compartment to the channel.

2. The switchgear enclosure of claim 1, further comprising:
a second cable compartment amongst the plurality of compartments, wherein the vent path structure is further arranged through the second cable compartment;
a third partition amongst the plurality of interior partitions, the third partition arranged to separate the first and second cable compartments; and
a third vent device in the third partition;
wherein at least a portion of the channel defines a third vent path between the second cable compartment and the opening; and
wherein the third vent device is configured to fluidically connect the second cable compartment to the channel.

3. The switchgear enclosure of claim 2, wherein:
the exterior housing includes first and second opposing walls;
the vent path structure includes a first vent path side between the bus compartment and the first wall, and a second vent path side between the bus compartment and the second wall; and
the vent path structure further includes a connector vent path side connected between the first and second vent path sides and adjacent the second and third vent devices, wherein the connector vent path side is arranged to fluidically direct arc gases from the bus compartment and the first cable compartment to the channel.

4. The switchgear enclosure of claim 3, wherein the connector vent path side is disposed in the second cable compartment.

5. The switchgear enclosure of claim 1, wherein:
the exterior housing includes first and second opposing walls; and
the vent path structure includes a first vent path side between the first wall and the bus and first cable compartments, a second vent path side between the second wall and the bus and first cable compartments, and a connector vent path side connected between the first and second vent path sides and adjacent the first vent device, wherein the connector vent path side is arranged to fluidically direct arc gases from the first switching device compartment to the channel.

6. The switchgear enclosure of claim 5, wherein the connector vent path side is disposed within the first cable compartment.

7. The switchgear enclosure of claim 1, wherein the vent path structure includes a plurality of integrally combined plate-like portions.

8. The switchgear enclosure of claim 7, wherein at least a section of the vent path structure includes longitudinal ridges extended from the plate-like portions, the vent path structure having a substantially U-shaped cross-section to form the channel with the exterior housing.

9. The switchgear enclosure of claim 7, wherein the vent path structure includes a first aperture in one of the plate-like portions within the bus compartment to fluidically connect an interior of the bus compartment to the channel, and a second aperture in one of the plate-like portions within the first cable compartment to fluidically connect an interior of the first cable compartment to the channel.

10. The switchgear enclosure of claim 1, wherein the exterior housing includes:
first and second opposing walls;
third and fourth opposing walls; and
fifth and sixth opposing walls, wherein the channel is formed between the first wall and the vent path structure and between the second wall and the vent path structure, and the channel extends from the sixth wall to the fifth wall.

11. The switchgear enclosure of claim 10, wherein the fifth wall includes at least one opening disposed to facilitate fluid communication with an outside of the enclosure through the opening.

12. The switchgear enclosure of claim 10, further comprising a second switching device compartment, a third partition interposed between the first switching device compartment and the second switching device compartment, and a third vent device in the third partition, wherein arc gases are releasable from the first switching device compartment via both the first and third vent devices.

13. The switchgear enclosure of claim 12, wherein the vent path structure is spaced from the third wall by the first and second switching device compartments.

14. The switchgear enclosure of claim 1, wherein each of the first switching device compartment, first cable compartment, and bus compartment is provided with at least two separate exits for arc gases.

15. A switchgear enclosure comprising:
an exterior housing including first and second opposing walls, third and fourth opposing walls, and fifth and sixth opposing walls, and a plurality of compartments within the exterior housing, the plurality of compartments including at least a first switching device compartment, a a bus compartment, and a first cable compartment;
a plurality of interior partitions arranged to subdivide the exterior housing into the plurality of compartments, the interior partitions including at least (i) a first partition between the first switching device compartment and the first cable compartment and (ii) a second partition between the bus compartment and the first cable compartment; and
an exhaust system including:
a vent path structure coupled within the exterior housing to define a channel between the vent path structure and the exterior housing, at least a portion of the channel defining a first vent path between the first switching device compartment and an opening formed in the exterior housing to vent arc gases from the first switching device compartment and to the opening; and
a first vent device in the first partition, the first vent device configured to fluidically connect the first switching device compartment to the channel;
wherein a first vent path side at least partially encloses a space between the first vent path side and the first wall, a second vent path side at least partially encloses a space between the second vent path side and the second wall, at least a portion of the channel defines a second vent path between the bus compartment and the opening, the exhaust system further includes a second vent device in the second partition, and the second vent device is configured to fluidically connect the bus compartment to the channel.

16. The switchgear enclosure of claim 15, wherein the fifth wall includes at least two openings respectively aligned with (i) the space between the first vent path side and the first wall and (ii) the space between the second vent path side and the second wall.

17. The switchgear enclosure of claim 15, wherein the first and second vent path sides, a third vent path side, and a fourth vent path side are integrally connected as a unit and assembled as a modular system within the exterior housing.

* * * * *